United States Patent [19]
Nielsen

[11] 3,829,100
[45] Aug. 13, 1974

[54] EDUCATION PUZZLE

[76] Inventor: Lloyd A. Nielsen, 4441 South Ave., West, Missoula, Mont. 59801

[22] Filed: Mar. 30, 1973

[21] Appl. No.: 346,565

[52] U.S. Cl............................ 273/157 R, 35/22 A
[51] Int. Cl. .............................................. A63f 9/12
[58] Field of Search ............ 273/156, 157 R, 153 P, 273/136 E; 35/27, 72, 73, 22 A; 46/16

[56] References Cited
UNITED STATES PATENTS

| 983,730 | 2/1911 | Leach...................... 273/153 P UX |
| 1,087,207 | 2/1914 | Austin................................. 35/73 X |
| 2,327,718 | 8/1943 | Kassler...................... 273/157 R UX |
| 2,611,193 | 9/1952 | Davis................................. 35/72 X |
| 2,738,779 | 3/1956 | Dalton...................... 273/153 P UX |

OTHER PUBLICATIONS
Profound Round, Mattel Catalog, page 9, received Apr. 18, 1970.

*Primary Examiner*—Anton O. Oechsle
*Attorney, Agent, or Firm*—Frederick E. Lange

[57] ABSTRACT

An educational puzzle in which there are a base member having a plurality of recesses therein, a corresponding number of pegs, each of a different color, and a corresponding number of blocks, each of the same color as one of said pegs. The blocks, when properly assembled, form a continuous layer of the same outline and size as the base member, so as to cover the base member. Preferably, the base member is circular and the pieces have largely arcuate edge walls. In assembly, the child places the pegs in the recesses in the base member and then places over each peg a block of the same color as the peg over which the block is placed, adjusting the angular position of the block until its fits snugly against the contiguous block or blocks.

10 Claims, 5 Drawing Figures

PATENTED AUG 13 1974  3,829,100
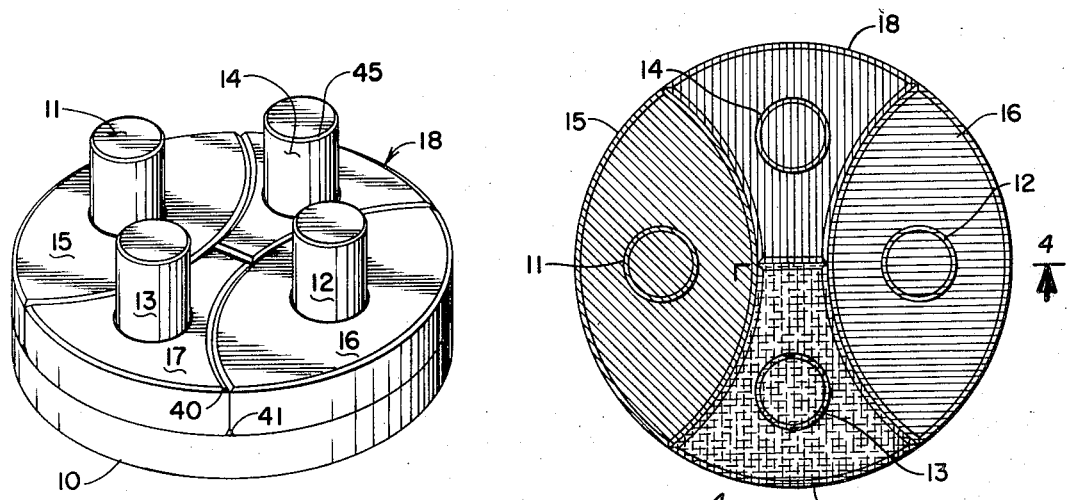
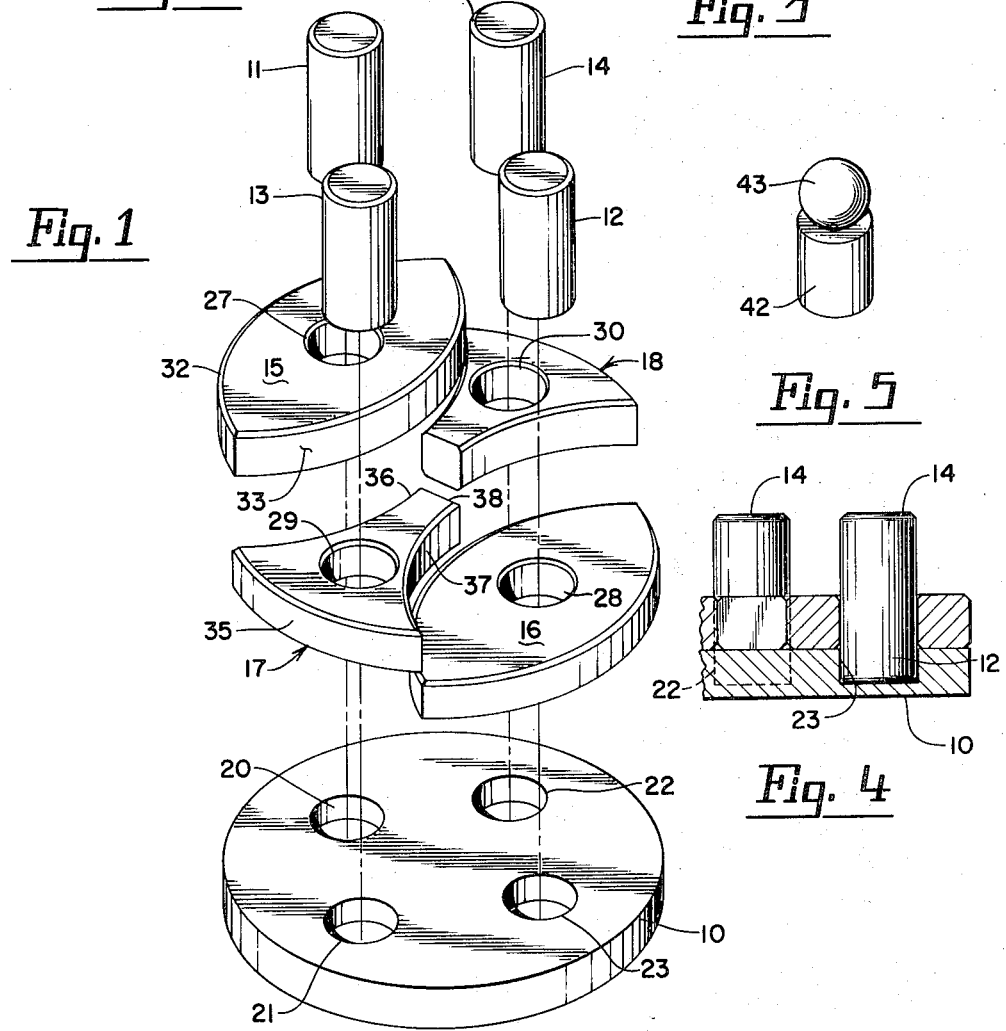

EDUCATION PUZZLE

BACKGROUND OF THE INVENTION

One of the toys which always fascinates a small child is a puzzle consisting of a number of pieces which can be fitted together. For very young children, the puzzle must be extremely simple to enable the child to have the sense of accomplishment which goes along with completing the puzzle without adult assistance. The use of colors can be of assistance in enabling a child to coordinate which pieces are intended to be associated with other pieces.

SUMMARY OF THE PRESENT INVENTION

The present invention is concerned with an educational puzzle in which there is a base member with recesses therein, a plurality of pegs which can be fitted into such recesses and a plurality of blocks which can be placed over the pegs to overlie the base member. The pegs are preferably of different colors and the blocks are each of a color corresponding to one of the pegs. The child is encouraged to match each block with a particular peg in order to facilitate grouping the pieces in the proper order. Because of the pegs, it is only necessary for the child to adjust the angular position of each individual block to bring it into the proper mating relationship with the adjacent block or blocks.

In a preferred form of my invention, each peg has a different color from the other and each block has a different color. Furthermore, the base member is preferably circular in cross-section and the major outer edge walls of the individual blocks are formed as circular arcs, the blocks collectively having a circular form when properly assembled.

In one form of my invention, the blocks have apertures completely therethrough and the pegs are of sufficient height to project above the blocks when they are placed over the pegs. The child thus sees the pegs when the puzzle is assembled and children of this age tend to relate the projecting pegs to people or other animals with which they are familiar.

In one particular form of my invention, there are four recesses in the base member, four pegs and two pairs of blocks, the blocks in each pair being identical to each other but different from the blocks in the other pair.

The pegs may be of uniform cylindrical form or they may have one end formed as a head portion to suggest to the child that the peg resembles a person.

Various other objects and features of the invention will be apparent from the consideration of the accompanying specification, claims and drawing.

BRIEF DESCRIPTION OF THE DRAWING

FIG. 1 is an exploded perspective view showing the various elements of my puzzle in disassembled form but in the relative positions which would enable them to be readily assembled;

FIG. 2 is a perspective view of my puzzle as assembled;

FIG. 3 is a plan view showing the various blocks and pegs color-coded to indicate the manner in which the colors of the blocks match the colors of the pegs when the puzzle is properly assembled;

FIG. 4 is a sectional view taken along the line 4—4 of FIG. 3 in the direction of the arrows adjacent that line; and FIG. 5 is a perspective view of a modified form of peg.

DESCRIPTION OF THE PREFERRED EMBODIMENT

Referring first to FIG. 1, it will be noted that the puzzle comprises a base member 10, four cylindrical peg members 11, 12, 13 and 14, and four block members 15, 16, 17 and 18. The base member 10 is provided with four recesses 20, 21, 22 and 23 into which the lower ends of the pegs 11, 12, 13 and 14 are designed to loosely fit. As best shown in the sectional view in FIG. 4 in connection with recesses 22 and 23, the recesses 20-23 do not extend all the way through the base member 10 but merely form the upper surface thereof part of the way to the bottom thereof. The pegs 11, 12, 13 and 14 are shown as being uniform cylinders of circular cross-section and the recesses 20, 21, 22 and 23 as being circular recesses of substantially the same diameter as the diameter of the pegs 11-14. It is to be understood, however, that the pegs may take other forms. Whatever their form, however, the recesses 20-23 should have generally the same cross-sectional configuration and size as the lower ends of the pegs 11-14 so that the pegs can be readily fitted into the recesses 20-23.

Each of the blocks 15-18 has an aperture therethrough, the diameter of this aperture being only slightly in excess of the diameter of the pegs 11-14. In the case of block 15, this aperture is indicated by the reference numeral 27. The apertures in blocks 16, 17 and 18 are indicated by the reference numerals 28, 29 and 30, respectively.

The blocks 15, 16, 17 and 18 are of such configuration that when they are properly assembled together, they form a continuous layer having a circular outline. While each piece could be formed as a sector of a circle, it is desirable to employ shapes which the child does not readily recognize as constituting parts of a circle. The puzzle thus becomes more of a challenge to the child. In the example shown, I have employed curved outer surfaces as much as possible. It will thus be noted that each of blocks 15 and 16 has two edge walls of arcuate form. Block 15 has two convex arcuate walls 32 and 33. Block 16 is formed in the same manner as block 15 and is identical thereto. Blocks 17 and 18 each have three arcuate walls and a short flat wall. Thus specifically referring to block 17, it has an outer arcuate edge wall 35 and two concave arcuate edge walls 36 and 37. There is a short edge wall 38 at the inner end of the block 17. Block 18 is identical to block 17 and its inner flat wall is intended to butt against the flat wall 38 of block 17.

As will be noted from the color coding on FIG. 3, each of the blocks 15, 16, 17 and 18 is of a different color. Thus block 15 is shown as colored green, block 16 colored blue, block 17 yellow and block 18 red. Similarly pegs 11, 12, 13 and 14 are colored green, yellow, blue and red respectively.

In assembling the puzzle, the child finds it relatively easy to place each of the pegs 11, 12, 13 and 14 into a separate one of the recesses 20-23. The child is now faced with assembling the blocks on the base member. The holes 27, 28, 29 and 30 through the respective blocks 15, 16, 17 and 18 suggest to the child that the blocks may be placed over one or more of the pegs 11-14. As the child continues to play with the puzzle, he will eventually tend to associate the red block 18 with the red peg 14, the green block 15 with the green peg 11, etc. When he has progressed to this point, each block will be on the right peg and all that will be necessary for the child to do to get the blocks 15, 16, 17 and 18 in the right relative position is to adjust their angular position around the peg. Thus, let us assume that the block 15 has been properly placed over the peg 11. Let us assume now that the child picks up the yellow block 17 and places it over the yellow peg 13. If the angular position of the yellow block 17 with respect to the green block 15 is not as shown in the drawing, the yellow block will not rest on the base member 10 since a portion of it will be resting upon the block 15. If, however, the child rotates the block 17 about the peg 13, it will sooner or later drop into position in which the arcuate surface 36 of the block 17 engages the arcuate surface 33 of the block 15.

If the child now picks up blue block 16 and places it over the blue peg 12, he is again faced with the possibility of the block 16 resting upon the block 17 if the block 16 is not correctly placed angularly with respect to block 17. The amount of angular error that the child can have with block 16 is relatively small, however, because of the possible engagement of the block with either peg 13 or peg 14 if the block is incorrectly placed angularly. Thus, it is necessary for the child only to make a small angular adjustment of block 16 to have it drop in place on the base member 10.

The child now has only one remaining block 18 to place in position. By this time, the space for this block is outlined by the inner curved walls of blocks 15 and 16 and by the short flat end wall of block 17. It is a simple matter for the child to adjust the angular position of block 18 when placed over peg 14 to cause it to drop into this space and engage the base member 10.

It will be noted that the blocks 15 and 16 are perfectly symmetrical about their longitudinal axis. The same is true of blocks 17 and 18. Thus, the child is not required to determine which surface should come uppermost. The block will fit properly with either surface uppermost. The blocks are preferably colored on all of the surfaces including the edges in the same manner so that regardless of the position the block is in when picked up by the child, the color of the block will be readily visible to the child. It will also be noted in FIG. 2 that the edge walls of the blocks 15-18 are beveled at their top and bottom as indicated by the reference numerals 40 and 41 in connection with the edges of the adjacent blocks 16 and 17. Each of the mating edge surfaces of all of the blocks are similarly beveled at their top and bottom. This makes it easier for the small child to fit the blocks together since the surfaces need not be perfectly aligned in order for the blocks to drop into position. For the same reasons, the pegs 11-14 have their upper surfaces beveled as indicated by the reference numeral 45 in connection with peg 14. Again, this makes it easier for the child to place a block over the peg.

The pegs shown in FIG. 5 are somewhat different from those shown in FIGS. 1-4 in that each has both a lower cylindrical portion 42 and an upper portion 43 which corresponds in shape to the major part of a sphere. The pieces shown in FIG. 5 have the advantage that they tend to more closely resemble people to an imaginative child. It has been discovered in working with children that the children tend to relate the pegs, even those of FIGS. 1 to 4, to people or other animals with which they are familiar. The peg shown in FIG. 5 more closely simulates a person, the spherical head 43 resembling the head of a person as far as an imaginative child is concerned.

It will be seen that I have provided a puzzle which, while simple to assemble, does present a challenge to a small child who is two years old or slightly older. The shape of the pieces 15, 16, 17 and 18 does not immediately suggest a circle to the child since they are pieces that the child does not readily identify as pieces of a circle. It will also be seen that the puzzle teaches color coordination in that the child is encouraged to place a green block over a green peg, a red block over a red peg, etc. Furthermore, the shapes of the pieces are such as to enable the individual pieces when disassembled to be used for other play purposes. It has been discovered that the pieces 15, 16, 17 and 18 are used by children to play "I Spy" games by putting the pieces with the holes in them up to their eyes and looking through them. They also make little boats with the pieces, as well as airplanes and butterflies. They like to manipulate these blocks by balancing them and placing them on top of each other. Further, as pointed out above, the pegs are used to simulate little people. Even after the puzzle is assembled, a child can look at the pegs 11-14 and imagine that the pegs are people standing on the base members.

While I have shown certain specific embodiments of my invention, it is to be understood that this is for the purpose of illustration only and that the scope of the invention is limited solely by the appended claims.

I claim as my invention:

1. An educational puzzle comprising:
a base member having a plurality of recesses therein,
a plurality of pegs of different colors and each having at least one extremity portion of a size and shape to removably fit into one of said recesses,
and a plurality of complementary blocks, each of a color corresponding to one of said pegs and having an aperture therein of a size and shape corresponding to the maximum cross-sectional size and shape of the opposite extremity portion of said peg to enable said block to be placed over said peg and to rest on said base member, said blocks being complementary in shape and having complementary curved edge surfaces such that when said blocks are properly placed over said pegs, they form a continuous layer covering a substantial portion of said base member.

2. The puzzle of claim 1 in which each peg is of a different color.

3. The puzzle of claim 1 in which said base member is circular in outline and in which said blocks collectively have a circular outline when properly assembled on said base member.

4. The puzzle of claim 3 in which the recesses for said pegs are uniformly disposed about the center of said base member.

5. The puzzle of claim 3 in which there are two pairs of blocks, the blocks in each pair being identical in shape to each other but of different shape than the blocks in the other pair.

6. The puzzle of claim 1 in which the recesses are of circular cross-section and in which the pegs are uniform cylinders of substantially the same circular cross-section as the recesses.

7. The puzzle of claim 1 in which the pegs are of cylindrical form except for the end opposite to the extremity portion which fits into one of said recesses, said end being formed with a contrasting head portion.

8. The puzzle of claim 7 in which the contrasting head portion constitutes the major portion of a sphere.

9. The puzzle of claim 1 in which each aperture in each of said blocks extends completely therethrough and in which said pegs are of sufficient length to project substantially above said blocks.

10. The puzzle of claim 5 in which each block of one pair has two opposite convex edge surfaces and each block of the other pair has two opposite concave edge surfaces which are complementary to the convex edge surface of the blocks of the first named pair.

* * * * *